United States Patent
Rader et al.

(10) Patent No.: US 10,033,272 B2
(45) Date of Patent: Jul. 24, 2018

(54) SWITCHING LOSS CORRECTION CIRCUITRY AND METHOD

(71) Applicant: QUALCOMM Incorporated, San Diego, CA (US)

(72) Inventors: William Rader, Carrboro, NC (US); Edward Robert Deak, Wake Forest, NC (US)

(73) Assignee: QUALCOMM Incorporated, San Diego, CA (US)

( * ) Notice: Subject to any disclaimer, the term of this patent is extended or adjusted under 35 U.S.C. 154(b) by 232 days.

(21) Appl. No.: 14/817,887

(22) Filed: Aug. 4, 2015

(65) Prior Publication Data

US 2016/0268899 A1 Sep. 15, 2016

Related U.S. Application Data

(60) Provisional application No. 62/136,420, filed on Mar. 20, 2015, provisional application No. 62/132,355, filed on Mar. 12, 2015.

(51) Int. Cl.
| | |
|---|---|
| *H02M 3/156* | (2006.01) |
| *H02M 3/157* | (2006.01) |
| *H02M 1/00* | (2006.01) |
| *H02M 3/158* | (2006.01) |
| *H02M 1/32* | (2007.01) |

(52) U.S. Cl.
CPC .......... *H02M 3/156* (2013.01); *H02M 3/157* (2013.01); *H02M 3/1584* (2013.01); *H02M 2001/008* (2013.01); *H02M 2001/0012* (2013.01); *H02M 2001/0048* (2013.01); *H02M 2001/0054* (2013.01); *H02M 2001/327* (2013.01); *Y02B 70/1491* (2013.01)

(58) Field of Classification Search
CPC . H02M 2001/0012; H02M 2001/0048; H02M 2001/0054; H02M 3/156; H02M 3/157; H02M 3/1584
See application file for complete search history.

(56) References Cited

U.S. PATENT DOCUMENTS

| | | | |
|---|---|---|---|
| 7,545,131 B1 | 6/2009 | Alexander | |
| 8,773,102 B2 | 7/2014 | Menegoli et al. | |
| 9,003,209 B2 | 4/2015 | Sizikov et al. | |
| (Continued) | | | |

FOREIGN PATENT DOCUMENTS

| | | |
|---|---|---|
| EP | 1662643 A2 | 5/2006 |
| GB | 2501783 A | 11/2013 |

OTHER PUBLICATIONS

International Search Report—PCT/US2016/019614—ISA/EPO—dated Jun. 21, 2016.
(Continued)

*Primary Examiner* — Fred E Finch, III
*Assistant Examiner* — Rafael O. De León Domenech
(74) *Attorney, Agent, or Firm* — Haynes and Boone, LLP

(57) ABSTRACT

A circuit that stores characterized loss information for a buck converter and uses the characterized loss information instead of measurements involving output power dependent losses. The characterized loss information may include the characterized switching loss, the characterized ripple loss, etc. The circuit may then calculate the output power, efficiency, power dissipation, etc. without needing to measure the output current.

12 Claims, 8 Drawing Sheets

(56) References Cited

U.S. PATENT DOCUMENTS

| | | | |
|---|---|---|---|
| 2013/0093251 A1* | 4/2013 | Kondo | H02M 3/1584 307/82 |
| 2014/0210437 A1 | 7/2014 | Chen | |
| 2014/0253056 A1 | 9/2014 | Hu et al. | |
| 2014/0266085 A1 | 9/2014 | Unno | |
| 2015/0108956 A1* | 4/2015 | Michal | H02M 1/088 323/271 |

OTHER PUBLICATIONS

Written Opinion—PCT/US2016/019614—ISA/EPO—dated Jun. 21, 2016.

Trescases O., et al., "A Digitally Controlled DC-DC Converter Module with a Segmented Output Stage for Optimized Efficiency", Proceedings of the 18th International Symposium on Power Semiconductor Devices & ICS, Jun. 4-8, 2006, Naples, Italy, (IEEE CAT. No. 06CH37817C), IEEE Operations Center, Piscataway, NJ, USA, Jun. 4, 2006 (Jun. 4, 2006), pp. 1-4, XP031462027, ISBN: 978-0-7803-9714-9.

Munir A., et al., "High-Performance Energy-Efficient Multicore Embedded Computing", IEEE Transactions on Parallel and Distributed Systems, IEEE Service Center, Los Alamitos, CA, US, vol. 23, No. 4, Apr. 1, 2012 (Apr. 1, 2012), pp. 684-700, XP011445046, ISSN: 1045-9219, DOI: 10.1109/TPDS.2011.214.

\* cited by examiner $$IN_{AVG} = \frac{P_{VDD}*(1-D)-I_{LOAD}*R}{R}*FSW*\left[\frac{D}{FSW}-\frac{L}{R}*\left(1-e^{-D\frac{R}{FSW}\cdot\frac{R}{L}}\right)\right] + \frac{\left[\frac{-D*P_{VDD}*-I_{LOAD}*R}{R}\right]*\left(1-e^{-\frac{(D-1)}{FSW}\cdot\frac{R}{L}}\right)+e^{-\frac{(D-1)}{FSW}\cdot\frac{R}{L}}*\frac{R}{L}*\left[\frac{P_{VDD}*(1-D)-I_{LOAD}*R}{R}\right]*\left(1-e^{-D\frac{R}{FSW}\cdot\frac{R}{L}}\right)}{\left(1-e^{-\frac{1}{FSW}\cdot\frac{R}{L}}\right)}$$
$$*FSW*\frac{L}{R}*\left(1-e^{-\frac{D-1}{FSW}\cdot\frac{R}{L}}\right)$$

FIG. 3

SWITCHING LOSS CORRECTION CIRCUITRY AND METHOD

CROSS-REFERENCE TO RELATED APPLICATIONS

The present application claims the benefit of U.S. Provisional App. No. 62/132,355 for "Switching Loss Correction Circuitry and Method" filed on Mar. 12, 2015; and the benefit of U.S. Provisional App. No. 62/136,420 for "Switching Loss Correction Circuitry and Method" filed on Mar. 20, 2015; which are incorporated herein by reference.

BACKGROUND

The disclosure relates to switched mode power supplies (SMPSs), and in particular, to estimating a switching loss of the SMPS.

Unless otherwise indicated herein, the approaches described in this section are not admitted to be prior art by inclusion in this section.

SMPSs include buck regulators and voltage regulators. A buck regulator may also be referred to as a buck converter. In general, a buck regulator receives an input voltage and generates a lower output voltage. The buck regulator may be referred to as a voltage step-down converter, or a current step-up converter. For example, a buck regulator may receive a 12 V input and may generate a 1.4 V output for a microprocessor (the load). In an ideal buck converter, power is conserved (e.g., the input power equals the output power). However, in a real (non-ideal) buck converter, not all power is conserved; some is lost (e.g., as heat) due to the operation of the physical components.

The efficiency of the (non-ideal) buck regulator may be determined by comparing the output power (Pout=Vout*Iout) and the input power (Pin=Vin*Iin). Thus, determining the efficiency requires a measurement of four attributes: the input voltage, the output voltage, the input current, and the output current.

SUMMARY

Measuring each of the attributes of the buck regulator requires circuitry to perform each measurement. The present disclosure is directed to reducing the number of measurements, and hence reducing the circuitry used to perform the measurements. Measuring each of the four attributes also involves output power dependent losses from measuring both the output voltage and the output current. Instead of measuring all four attributes (with the associated output power dependent losses), example implementations perform fewer measurements and use a loss estimation factor to compute the non-measured attribute (or to perform other computations that would otherwise use the non-measured attribute). The circuitry for measuring current is often more costly than the circuitry for measuring voltage, so example implementations measure the input voltage, the output voltage, and either the input current or the output current. The loss estimation factor is determined by characterizing the buck regulator; the loss estimation factor is stored and is accessed as needed during operation of the buck regulator.

Example implementations may also measure the duty cycle. The duty cycle measurement may be made more accurately than measurement of the output current Tout using inductor DC resistance sensing or internal FET VDS (field effect transistor drain to source voltage) sensing. Neither of these add any losses in the power path, and perform sensing at much lower power draw that output resistor sensing (which is lossy, but more accurate in practice than inductor DC resistance sensing or internal FET VDS sensing).

Example implementations are directed toward applying a numerically quantified loss correction to the measured input current, to calculate the output current, in a SMPS employing integrated power field effect transistors (FETs). Switching losses, and ripple losses, are included in the SMPS input current measurement but do not contribute to the output current. A simple calculation of the output current to the load based on the input current and the duty cycle will lead to an error due to these losses. Example implementations use a processor to apply a digital correction factor stored on the device to the input current measurement. Example implementations are applicable to SMPS employing internal or external power FETs. Example implementations employ a switching loss sensor and trim to quantify these losses for use in the calculation of output current, efficiency, and other operational criteria. According to an example implementation, the switching loss sensor is an on-chip, scaled representation of the power FETs, so the method is particularly applicable to an SMPS employing integrated power FETs.

In one example implementation, an electronic device includes a buck converter, a memory, and a processor. The buck converter receives an input power and generates an output power according to a duty cycle of the buck converter. The buck converter has a switching frequency. The memory stores information of a characterized switching loss of the buck converter. The processor calculates an estimated switching loss of the buck converter according to the information of the characterized switching loss, an input voltage of the buck converter, and the switching frequency of the buck converter. The processor adjusts, in response to the estimated switching loss, a power consumption of a load that receives the output power.

The electronic device may further comprise a voltage sensor that measures the input voltage of the buck converter.

The buck converter may include a high side transistor and a low side transistor, where the characterized switching loss of the buck converter corresponds to a gate charge Qg of the high side transistor and the low side transistor.

The electronic device may further comprise a current sensor that measures an input current of the buck converter. The processor may calculate an output current of the buck converter according to the input current of the buck converter, the estimated switching loss, and the duty cycle of the buck converter.

The electronic device may further comprise a voltage sensor that measures an output voltage of the buck converter. The processor may calculate an efficiency of the buck converter according to the input voltage of the buck converter, the output voltage of the buck converter, the duty cycle of the buck converter, the estimated switching loss, and an input current of the buck converter.

The electronic device may further comprise an input voltage sensor, an output voltage sensor, and a current sensor. The input voltage sensor measures the input voltage of the buck converter. The output voltage sensor measures an output voltage of the buck converter. The current sensor measures only one of the input current of the buck converter and the output current of the buck converter, and in this case the current sensor measures the input current. The processor calculates an output power of the buck converter according to the input voltage, the output voltage, the input current, the duty cycle, and the estimated switching loss.

The electronic device may further comprise an input voltage sensor, an output voltage sensor, and a current sensor. The input voltage sensor measures the input voltage of the buck converter. The output voltage sensor measures an output voltage of the buck converter. The current sensor measures only one of the input current of the buck converter and the output current of the buck converter, and in this case the current sensor measures the output current. The processor calculates an input power of the buck converter according to the input voltage, the output voltage, the output current, the duty cycle, and the estimated switching loss.

The electronic device may further comprise an input voltage sensor, an output voltage sensor, and a current sensor. The input voltage sensor measures the input voltage of the buck converter. The output voltage sensor measures an output voltage of the buck converter. The current sensor measures only one of the input current of the buck converter and the output current of the buck converter. The processor calculates a power dissipation of the buck converter according to the input voltage, the output voltage, the only one of the input current and the output current, the duty cycle, and the estimated switching loss.

The electronic device may further comprise a programmable current source, a voltage comparator, a capacitor, and a switch. The programmable current source is coupled to the input node and to a test node, and generates a test current in response to a control signal. Adjusting the control signal adjusts the test current. The voltage comparator is coupled to the test node, and outputs a switch control signal based on a comparison of a test voltage at the test node and a reference voltage. The capacitor is coupled to the test node. The capacitor is ratioed to the high side switch and the low side switch. The switch is coupled to the test node in parallel with the capacitor, and is controlled by the switch control signal. The control signal is adjusted until a capacitance of the capacitor corresponds to a switching frequency of the buck converter, the reference voltage and the test current. The characterized switching loss corresponds to the capacitance.

The memory may store information of a characterized ripple loss of the buck converter. The processor calculates an estimated ripple loss according to the information of the characterized ripple loss, the switching frequency of the buck converter, the input voltage of the buck converter, an output voltage of the buck converter, and the duty cycle of the buck converter. The processor adjusts the power consumption of the load in response to the estimated ripple loss.

The buck converter may include an inductor, a high side transistor, and a low side transistor. The characterized ripple loss corresponds to a direct current resistance of the inductor, a drain-to-source resistance of the high side transistor, and a drain-to-source resistance of the low side transistor.

The processor may calculate an efficiency of the buck converter according to the input voltage of the buck converter, the output voltage of the buck converter, the duty cycle of the buck converter, an input current of the buck converter, the estimated switching loss, and the estimated ripple loss.

The buck converter may include an inductor, and the electronic device further comprises a measurement circuit coupled to the inductor. The measurement circuit measures a parasitic resistance of the buck converter and an inductance of the inductor. The characterized ripple loss corresponds to the parasitic resistance and the inductance.

In another example implementation, a method of operating a buck converter includes storing information of a characterized switching loss of the buck converter. The method further includes receiving, by the buck converter, an input power. The method further includes generating, by the buck converter, an output power according to a duty cycle of the buck converter. The buck converter has a switching frequency. The method further includes calculating an estimated switching loss of the buck converter according to the information of the characterized switching loss, an input voltage of the buck converter, and the switching frequency of the buck converter. The method further includes adjusting, in response to the estimated switching loss, a power consumption of a load that receives the output power.

The method may further comprise measuring the input voltage of the buck converter. The method may further comprise calculating an output current of the buck converter according to the input current of the buck converter, the estimated switching loss, and the duty cycle of the buck converter.

The method may further comprise measuring an output voltage of the buck converter. The method may further comprise calculating an efficiency of the buck converter according to the input voltage of the buck converter, the output voltage of the buck converter, the duty cycle of the buck converter, the estimated switching loss, and an input current of the buck converter. Adjusting the power consumption comprises adjusting, in response to the efficiency, the power consumption.

The method may further comprise measuring the input voltage of the buck converter, measuring an output voltage of the buck converter, measuring the input current of the buck converter, and calculating an output power of the buck converter according to the input voltage, the output voltage, the input current, the duty cycle, and the estimated switching loss.

The method may further comprise measuring the input voltage of the buck converter, measuring an output voltage of the buck converter, measuring the output current of the buck converter, and calculating an input power of the buck converter according to the input voltage, the output voltage, the output current, the duty cycle, and the estimated switching loss.

The method may further comprise measuring the input voltage of the buck converter, measuring an output voltage of the buck converter, measuring only one of the input current of the buck converter and the output current of the buck converter, and calculating a power dissipation of the buck converter according to the input voltage, the output voltage, the only one of the input current and the output current, the duty cycle, and the estimated switching loss. Adjusting the power consumption comprises adjusting, in response to the power dissipation, the power consumption.

The method may further comprise storing information of a characterized ripple loss of the buck converter. The method may further comprise calculating an estimated ripple loss according to the information of the characterized ripple loss, the switching frequency of the buck converter, the input voltage of the buck converter, an output voltage of the buck converter, and the duty cycle of the buck converter. The method may further comprise adjusting the power consumption of the load in response to the estimated ripple loss.

In another example implementation, an electronic device comprises a first means, a second means, and a third means. The first means receives an input power and generates an output power according to a duty cycle of the first means. The first means has a switching frequency. The second means stores information of a characterized switching loss of the first means. The third means calculates an estimated switching loss of the first means according to the information of the characterized switching loss, an input voltage of the first means, and the switching frequency of the first means. The third means adjusts, in response to the estimated switching loss, a power consumption of a load that receives the output power.

In another example implementation, a system includes a plurality of buck converters, a plurality of memories, and a processor. The plurality of buck converters receives a plurality of input powers, and generates a plurality of output powers according to a plurality of duty cycles of the plurality of buck converters. Each of the plurality of buck converters receives a respective one of the plurality of input powers and generates a respective one of the plurality of output powers. The plurality of buck converters has a plurality of switching frequencies, where each of the plurality of buck converters has a respective one of the plurality of switching frequencies. The plurality of memories stores information of a characterized switching loss of each of the plurality of buck converters. The processor calculates a plurality of estimated switching losses of the plurality of buck converters according to the information of the characterized switching loss of each of the plurality of buck converters, an input voltage of each of the plurality of buck converters, and the switching frequency of each of the plurality of buck converters. The processor adjusts, in response to the plurality of estimated switching losses, a power consumption of each one or more of a plurality of loads that receives the plurality of output powers.

The processor may adjust the power consumption of each one or more of the plurality of loads to perform load balancing among the plurality of loads, according to the plurality of estimated switching losses.

The processor may adjust the power consumption of each one or more of the plurality of loads to perform load balancing among the plurality of loads, according to the plurality of estimated switching losses, by increasing the power consumption of one of the plurality of loads and decreasing the power consumption of another of the plurality of loads.

The processor may adjust the power consumption of each one or more of the plurality of loads to perform load balancing among the plurality of loads, according to the plurality of estimated switching losses, by increasing the power consumption of one or more of the plurality of loads respectively and decreasing the power consumption of one or more other of the plurality of loads respectively.

The adjustment of the power consumption of the load may be indirectly in response to the estimated loss. For example, the estimated loss may be used to perform other calculations; these other calculations are then used to adjust the power consumption of the load. Despite these intermediate calculations, the adjustment is still considered to be in response to the estimated loss.

The following detailed description and accompanying drawings provide a better understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, make apparent to those of skill in the art how implementations in accordance with the present disclosure may be practiced. In the accompanying drawings:

FIG. 3 shows an equation for modeling the average input current $IN_{AVG}$.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

The following discussion uses the terms "buck converter" and "buck regulator". These terms are used interchangeably. As discussed above, a buck converter is a type of SMPS. The examples discussed herein show a buck converter, for ease of illustration. It is to be understood that implementations may also be applied to voltage regulators, or to SMPSs generally. Thus, the term buck converter may be used interchangeably with voltage regulator and SMPS. When the distinction between them is relevant, such will be specifically pointed out.

As mentioned above, customers often want reporting for input current, output current and power converter efficiency, but separate accurate measurements for input and output current requires significant area, complexity, power loss, etc. Switching losses show at the input of SMPS but do not contribute to output current, which leads to an error term when using duty cycle to calculate the input current, output current or efficiency. In addition, if the output current is sensed across the DC resistance of the inductor, this requires temperature correction during normal use mode, and is extremely difficult to achieve better than 10% accuracy. Finally, internal drain to source voltage (VDS) sensing during the on-state of the high side or low-side power FETs is problematic as the signal is time-varying and is very difficult to measure to achieve better than 10% accuracy. Example implementations are directed toward overcoming these issues.

Figure 1:
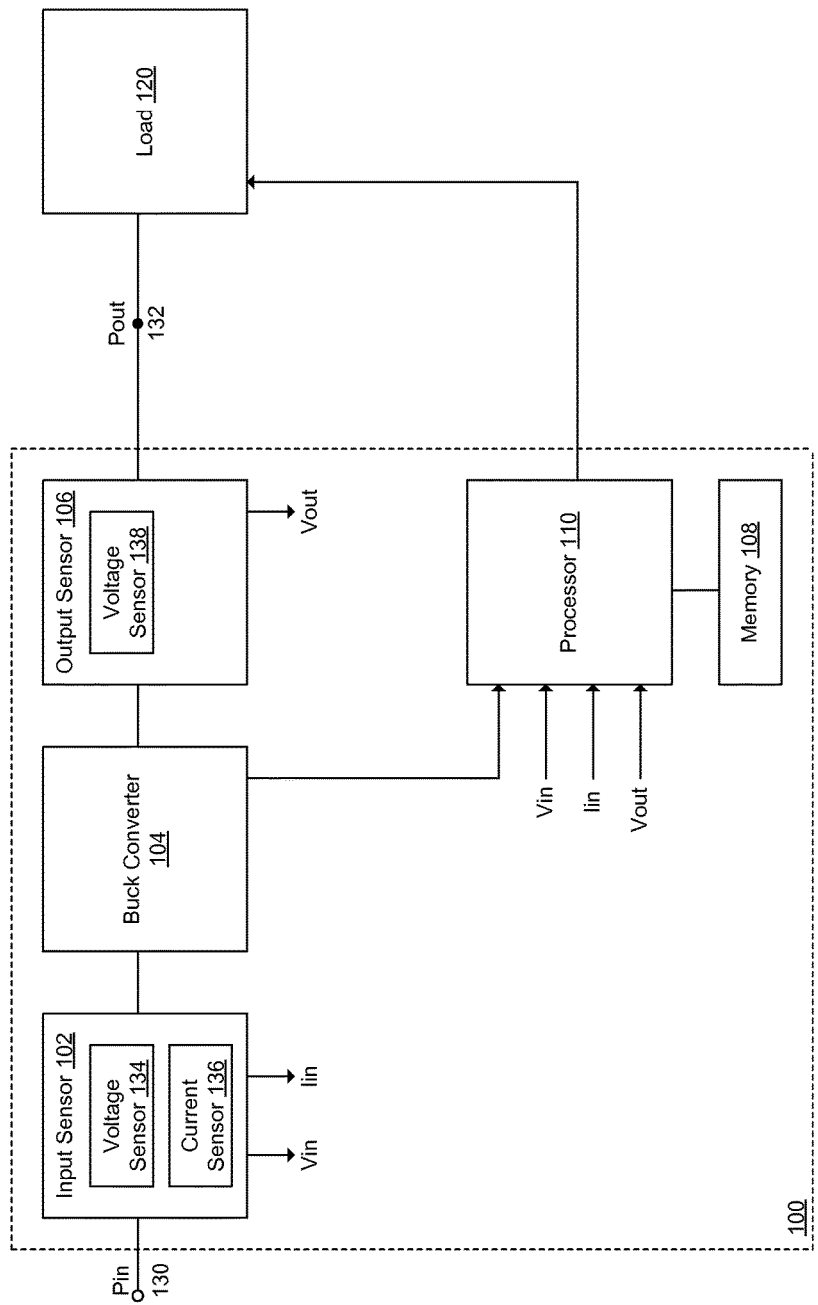
FIG. 1 is a block diagram of an electronic device 100.

FIG. 1 is a block diagram of an electronic device 100. The electronic device 100 includes an input sensor 102, a buck converter 104, an output sensor 106, a memory 108, and a processor 110. The electronic device 100 connects to a load 120. In general, the electronic device 100 receives an input power 130, performs conversion of the input power 130 using the buck converter 104, and provides an output power 132 to the load 120.

The input sensor 102 includes a voltage sensor 134 and a current sensor 136. The voltage sensor 134 senses (e.g., measures) the input voltage Vin of the input power 130, and the current sensor 136 senses the input current Iin of the input power 130. The input voltage Vin and the input current Iin measurements are provided to the processor 110, and may also be provided to other components of the electronic device 100.

The buck converter 104 receives the input power 130, performs conversion of the input power 130 to the output power 132, and provides the output power 132 to the load 120. The input voltage and the output voltage are related according to the duty cycle D of the buck converter 104, according to the following (ideal) equation:

$$D = \frac{Vout}{Vin}$$

The duty cycle D is between zero and one, and the buck converter 104 is referred to as a step-down converter since Vout is less than or equal to Vin. As detailed below, the buck converter 104 has a high side switch and a low side switch; these switch according to a switching frequency.

Similarly, the duty cycle D relates the output current Tout and the input current Iin according to the following (ideal) equation:

$$Iout = \frac{Iin}{D}$$

The output sensor 106 includes a voltage sensor 138. The voltage sensor 138 senses the output voltage Vout of the output power 132. The output voltage Vout measurement is provided to the processor 110, and may also be provided to other components of the electronic device 100.

The duty cycle equations above are for an ideal buck converter. In the (non-ideal) buck converter 104, there are losses, such as the switching loss, the ripple loss, etc. The memory 108 and the processor 110 operate to account for these losses.

The memory 108 stores information of a characterized switching loss of the buck converter 104. According to another example implementation, the memory 108 stores information of a characterized ripple loss of the buck converter 104. According to a further example implementation, the memory 108 may store both the information of the characterized switching loss and the information of the characterized ripple loss. In general, the switching loss is characterized according to a capacitance value, and the ripple loss is characterized according to the combination of a resistance value and an inductance value. The switching loss, the ripple loss, and the characterization process are all described in more detail below. The memory 108 may be a non-volatile memory such as a read-only memory (ROM), programmable ROM (PROM), erasable PROM (EPROM), electrically EPROM (EEPROM), etc. The memory 108 may also store other information.

The processor 110 calculates an estimated switching loss of the buck converter 104 according to the information of the characterized switching loss, the input voltage of the buck converter 104, and the switching frequency of the buck converter 104. Based on (e.g., in response to) the estimated switching loss, the processor 110 adjusts the power consumption of the load 120 that receives the output power 132. For example, the load 120 may be a microprocessor that consumes power according to its frequency. To reduce the power consumption of the load 120 (microprocessor), the processor 110 instructs the load 120 (microprocessor) to reduce its frequency, which reduces its current consumption.

To increase the power consumption of the load 120 (microprocessor), the processor 110 instructs the load 120 (microprocessor) to increase its frequency, which increases its current consumption.

According to another example implementation, the processor 110 calculates an estimated ripple loss according to the information of the characterized ripple loss, the switching frequency of the buck converter 104, the input voltage of the buck converter 104, the output voltage of the buck converter 104, and the duty cycle of the buck converter 104. Based on the estimated ripple loss, the processor 110 adjusts the power consumption of the load 120.

According to a further example implementation, the processor 110 may calculate both the estimated switching loss and the estimated ripple loss, and may adjust the power consumption of the load 120 in response to both the estimated switching loss and the estimated ripple loss. The processor 110 may also perform other functions besides calculating the estimated switching loss or the estimated ripple loss, for example to monitor or control other aspects of the electronic device 100.

As discussed further below, the processor 110 may use the estimated switching loss or the estimated ripple loss to perform further calculations, such as the converter efficiency or the power dissipation. The processor may then adjust the power consumption of the load 120 based on the further calculations (which were themselves based on the estimated switching loss or the estimated ripple loss).

As the power consumption of the load 120 changes, the operational parameters of the buck converter 104 change in response, as the buck converter 104 operates to provide the desired output power 132 from the given input power 130. These parameters include the duty cycle, the efficiency, the power dissipation, etc. For example, if the load 120 is drawing less current, the power dissipation and duty cycle of the buck converter 104 decreases as well. The efficiency typically reaches a peak value at a given load amount, and decreases if the load amount is increased or decreased from that point. As another example, if the load 120 is drawing more current, such that the parasitic losses cause the output voltage Vout to drop, the feedback mechanism inside the buck regulator 104 will increase the duty cycle about the ideal ratio (Vout/Vin) to bring the output voltage Vout back to its design value.

The processor 110 may use various criteria to determine whether, and how, to adjust the power consumption of the load 120. These criteria include, for the buck converter 104, the output current, the efficiency, the input power, the output power, and the power dissipation. The processor 110 calculates these criteria according to one or both of the estimated switching loss and the estimated ripple loss, one or more of three measurements (three of the input voltage, the input current, the output voltage, and the output current), and a duty cycle measurement. Specifically for the electronic device 100, the measurements are the input voltage, the input current, the duty cycle, and the output voltage. (In general, there is less loss from measuring the input current than measuring the output current.) Thus, the electronic device 100 calculates the criteria using four accurate measurements, which do not result in output power dependent losses (e.g., an Iout measurement) as in other systems.

In general, the processor 110 may calculate the criteria using the following parameters. The efficiency may be calculated using the input voltage, the output voltage, the duty cycle, the estimated switching loss, the estimated ripple loss, and the input current. The output current may be calculated using the duty cycle, the input current, the estimated ripple loss, and the estimated switching loss. The output power may be calculated using the input voltage, the output voltage, the input current, the estimated ripple loss, and the estimated switching loss. The input power may be calculated using the input voltage and the input current. The input power may be calculated using the input voltage, the output voltage, the output current, the estimated ripple loss, and the estimated switching loss. The power dissipation may be calculated using the input voltage, the output voltage, only one of the input current and the output current, the estimated ripple loss, and the estimated switching loss. The estimated ripple loss may be omitted from the calculations as desired. For example, under conditions when the estimated ripple loss is small in comparison to the estimated switching loss, the estimated ripple loss may be omitted from the calculation, in which case the estimated ripple loss need not be computed. Specific equations for these calculations are provided in subsequent paragraphs. Alternatively, other criteria may be calculated using one or more of the parameters, as desired.

Alternate implementations may use another set of the three measurements, with corresponding rearrangement of the sensors as appropriate. For example, the three measurements may be the input voltage, the input current, and the output current. The three measurements may be the input voltage, the output voltage, and the output current. The three measurements may be the input current, the output voltage, and the output current.

Figure 2:
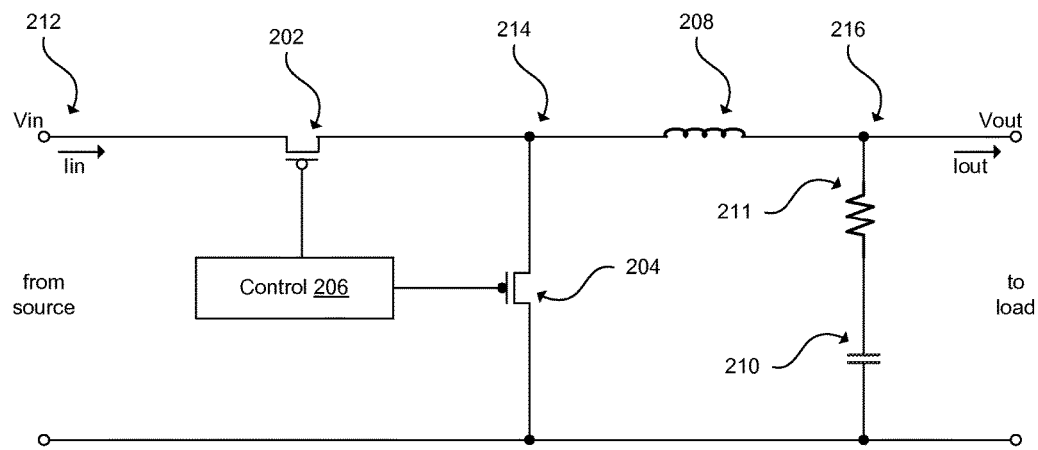
FIG. 2 is a block diagram of a buck converter 200.

FIG. 2 is a block diagram of a buck converter 200. The buck converter 200 may be similar to the buck converter 104 (see FIG. 1). The buck converter 200 includes a high side switch 202, a low side switch 204, a control circuit 206, an inductor 208, and a capacitor 210. Also shown are an input node 212, a switching node 214, and an output node 216. The buck converter receives an input power having an input voltage Vin and an input current Iin, and outputs an output power having an output voltage Vout and an output current Iout.

The high side switch 202 couples the input voltage Vin and the input current Iin from the input node 212 to the switching node 214. The high side switch 202 may be a p-channel metal oxide semiconductor (PMOS) switch, for example a p-channel field effect transistor (PFET).

The low side switch 204 couples the switching node 214 to the ground connection. The low side switch 204 may be an n-channel metal oxide semiconductor (NMOS) switch, for example an n-channel field effect transistor (NFET).

The control circuit 206 controls the high side switch 202 and the low side switch 204. The control circuit 206 may control the switches synchronously, such that the low side switch 204 is off when the high side switch 202 is on, and the low side switch 204 is on when the high side switch 202 is off. Alternatively, the control circuit 206 may control the switches according to non-synchronous, or other different, timings. The control circuit 206 may perform the switching according to a duty cycle, switching frequency, or other parameters of the buck converter 200.

The inductor 208 couples the switching node 214 to the output node 216. In general, the inductor 208 resists changes in electric current passing through it. The inductor 208, along with the switches 202 and 204, operate to perform the conversion as discussed below.

The capacitor 210 couples the output node 216 to the ground connection. In general, the capacitor 210 reduces the ripple of the output voltage Vout.

The operation of the buck converter 200 is generally as follows. In continuous conduction mode, the average current in the inductor 208 is I0. Beginning with the high side switch 202 open (in the "off" position), and the low side switch 204 closed ("on"), the current in the circuit is Iv (or the valley current, the lowest current in the inductor 208). When the high side switch 202 is first closed (and the low side switch 204 is opened), the voltage impressed across the inductor 208 is Vin-Vout, and the current will begin to increase at the rate of (Vin-Vout)/L. This current will charge the capacitor 210 which will increase the voltage Vout. During this time, the inductor 208 is storing energy in the form of a magnetic field. At the end of this increasing current cycle, the output voltage Vout will reach a voltage peak, and the current in the inductor 208 will reach a current peak Ip (or peak current). Once the circuit reaches the peak value designed in the control circuit 206, the control circuit 206 will open the high side switch 202 (and close the low side switch 204). The point in time at which this happens is an integer multiple of the period (N/FSW) plus the duty cycle times the period, or D/FSW. The voltage impressed across the inductor 208 is now (0-Vout) and the current in the inductor 208 changes (decreases) at a rate of -Vout/L. As this happens, the capacitor 210 is discharging due to the load, and the current will be allowed to decrease until the beginning of the next period, which will be (N+1)/FSW. Neglecting inductor saturation or other non-ideal effects, the average load current I0 will be equal to the average inductor current (Ip+Iv)/2.

The buck regulator 200 illustrates the switching loss and ripple loss, as follows.

Switching Loss

In general, the switching loss results from the power lost from switching the high side switch 202 and the low side switch 204. For many high efficiency buck converters, almost all of the switching loss for the switches 202 and 204 is proportional to their gate charge Qg. The gate charges Qg of the switches 202 and 204 track each other as a function of the device geometries since they are fabricated on the same silicon chip with the same gate oxide. In an alternate implementation where the switches do not share the same gate oxide, their gate charges Qg may be calibrated separately. An equation for modeling the switching loss power is as follows:

$$P_{SWLOSS} = C \cdot V^2 \cdot F$$

where $P_{SWLOSS}$ is the switching loss power, C is a capacitance value, V is the input voltage Vin, and F is the switching frequency. An equation for modeling the switching loss current $I_{SWLOSS}$ is as follows:

$$I_{SWLOSS} = C \cdot V \cdot F$$

where C, V and F are as described for the switching loss power equation. The input voltage V may be measured (see the voltage sensor 134 in FIG. 1), and the switching frequency F may also be known (e.g., it is set or measured). The capacitance value C corresponds to the gate charge Qg of the high side switch 202 and the capacitance of other components of the buck converter 200. The capacitance value C then corresponds to the information of the characterized switching loss discussed above. A circuit for characterizing the capacitance value C is described in more detail in subsequent sections.

Ripple Loss

In general, the ripple loss results from the power lost from the ripple current through the buck converter 200, the resistance of the inductor 208, the equivalent series resistance of the capacitor 210 (shown as a resistor 211), and the switching resistance of the high and low side switches 202 and 204. Ripple loss may also be referred to as a portion of the conduction loss, since almost all of the conduction loss in the converter for high values of Iout comes from the average output current thru the parasitic resistances (FET RDSON (drain to source resistance when on), inductor DCR and other parasitic resistance in the power path). Ripple losses will have an effect on the input current which does not match the simple duty cycle equation given above regarding the buck converter 104 (see FIG. 1).

FIG. 3 shows an equation for modeling the average input current $IN_{AVG}$, with the assumption that the switching loss is zero. In the equation of FIG. 3, $P_{VDD}$ is the input power, D is the duty cycle, $I_{LOAD}$ is the output current, R is the combined resistance of the entire power path, FSW is the switching frequency, and L is the inductance of the power inductor 208 (see FIG. 2). For the equation of FIG. 3, the losses therein correspond to the ripple current and its corresponding ripple loss. This results in the following equation:

$$I_{INPUT} = D \cdot I_{OUTPUT} + \frac{1}{V_{IN}} \cdot \frac{R_L \cdot (I_P - I_V)^2}{12}$$

where $I_{INPUT}$ is the input current, D is the duty cycle, $I_{OUTPUT}$ is the output current, $V_{IN}$ is the input voltage, $R_L$ is the sum of the resistance of the buck converter 200, the direct current (DC) resistance of the inductor 208, and the equivalent series resistance of the capacitor 210, $I_P$ is the peak level of the output current $I_{OUT}$, and Iv is the valley level of the output current $I_{OUT}$.

Equations for modeling the ripple loss current are as follows:

$$I_{RIPPLE\_LOSS} = \frac{R_{PARASITIC}}{V_{IN} \cdot 12} \cdot \left(\frac{V_{IN} - V_{OUT}}{L} \cdot \frac{D}{F_{SW}}\right)^2$$

$$I_{RIPPLE\_LOSS} = \frac{R_{PARASITIC}}{L^2 \cdot F_{SW}^2} \cdot \frac{1}{V_{IN} \cdot 12} \cdot ((V_{IN} - V_{OUT}) \cdot D)^2$$

As mentioned above, if the inductor ripple losses are low (e.g., by application design) or are known (e.g., by detailed analysis and tight manufacturing control), they can be ignored. Otherwise the ripple losses may be corrected for in the calculation of the output current based on a measurement of the input current, using the information of the characterized ripple loss, as discussed above. The combination of the parasitic resistance $R_{PARASITIC}$ and the square of the inductance $L^2$ then corresponds to the information of the characterized ripple loss discussed above. A circuit for characterizing the parasitic resistance $R_{PARASITIC}$ and the square of the inductance $L^2$ is described in more detail in subsequent sections.

Figure 4:
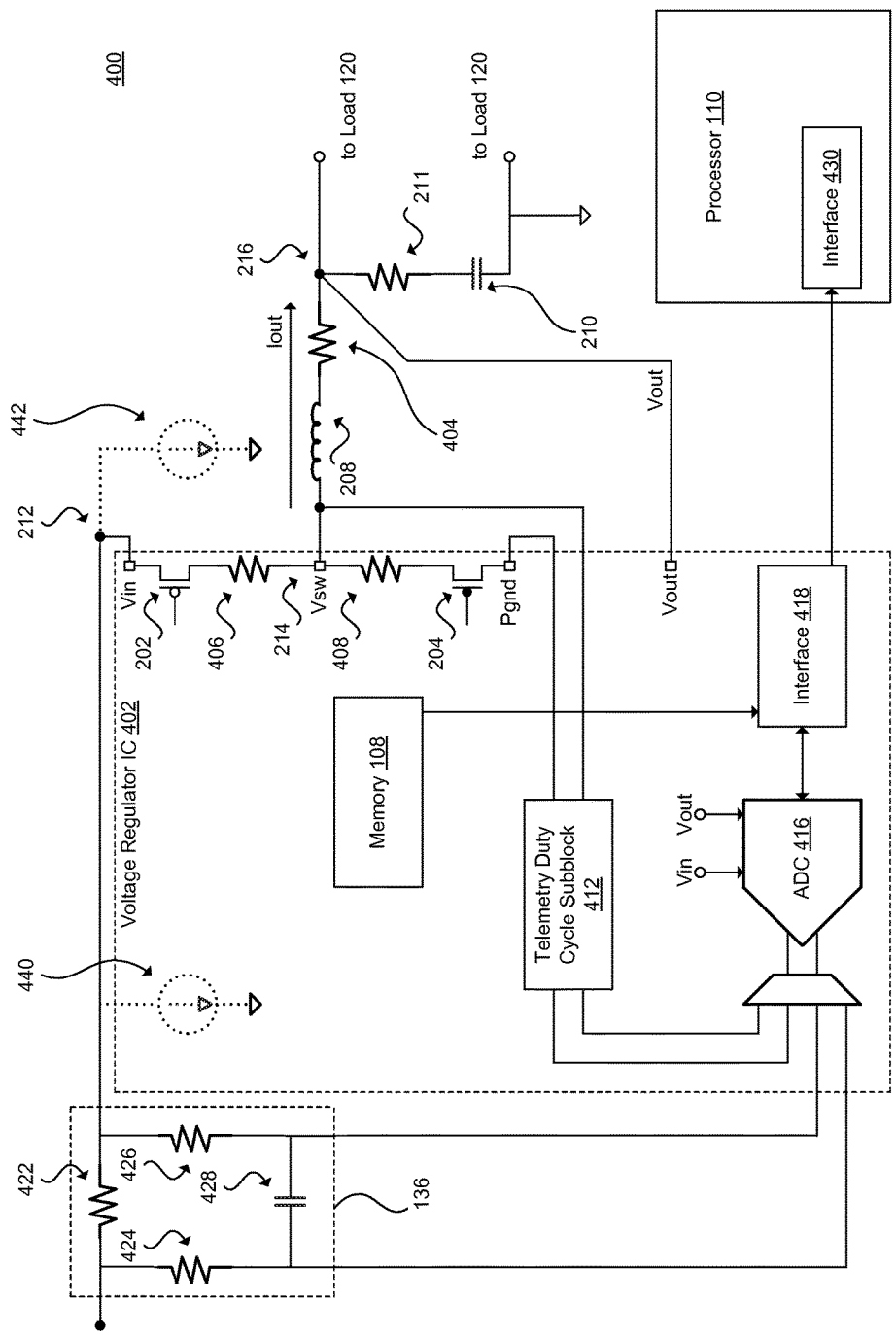
FIG. 4 is a block diagram of an electronic device 400.

FIG. 4 is a block diagram of an electronic device 400. The electronic device 400 is similar to the electronic device 100 (see FIG. 1), with more detail including some of the details from the buck converter 200 (see FIG. 2); similar reference numerals are used for similar elements. The electronic device 400 includes the current sensor 136, a voltage regulator integrated circuit 402, the inductor 208, a resistor 404 (representing the ESR of the inductor 208), the capacitor 210, and the processor 110. Labels include the input voltage Vin, the switching voltage Vsw, the ground power Pgnd, the output voltage Vout, and the output current Iout. Also shown are the input node 212, the switching node 214, and the output node 216. The output node 216 is coupled to the load 120.

The voltage regulator integrated circuit 402 includes components of the buck converter 200 (see FIG. 2), including the high side switch 202, the low side switch 204, a high side resistor 406, and a low side resistor 408. (Note that the resistors 406 and 408 signify the resistance associated with their respective switches 202 and 204, and are not additional elements intentionally designed into the circuit.) The voltage regulator integrated circuit 402 also includes the memory 108 (see FIG. 1), a telemetry duty cycle subblock 412, a multiplexer 414, an analog to digital converter (ADC) 416, and an interface 418. Note that other components of the buck converter 200 (e.g., the control circuit 206, etc.) and their related connections are not shown.

The current sensor 136 includes a sense resistor 422, filter resistors 424 and 426, and a filter capacitor 428. The sense resistor 422 measures the input current Iin, as filtered by the filter resistors 424 and 426, and the filter capacitor 428. The current sensor 136 is coupled to the multiplexer 414.

The telemetry duty cycle subblock 412 determines the duty cycle based on the voltage at the switching node 214. The multiplexer 414 selectively provides the output from the current sensor 136 and from the telemetry duty cycle subblock 412 to the ADC 416.

The ADC 416 receives the output from the multiplexer 414, the input voltage Vin, and the output voltage Vout, converts this information from analog form to digital form, and provides the digital information to the interface 418. Thus, the ADC 416 performs the functions of the voltage sensors 134 and 138 (see FIG. 1). The digital information may include the current measurements, the voltage measurements, the switching frequency information, etc. for calculating the estimated switching loss, the estimated ripple loss, etc.

The interface 418 receives the information from the ADC 416 and the information from the memory 108. As discussed above, the information in the memory 108 is the characterized information of the losses, such as the characterized switching loss, the characterized ripple loss, etc. The interface 418 sends this information to an interface 430 of the processor 110. The interfaces 418 and 430 may be serial interfaces with a data line and a clock line.

Also shown are a switching loss model 440 and a ripple loss model 442. Note that these are not components per se, but are shown as current sinks for discussion purposes. As discussed above, the switching loss model 440 models the losses due to switching in the voltage regulator 402, and the ripple loss model 442 models the losses due to the ripple current in the various components (the switches 202 and 204, the inductor 208, etc.).

As discussed above, the processor 110 computes the estimated switching loss and the estimated ripple loss, e.g. as the switching loss current and the ripple loss current. Based on the above equations for the switching loss current $I_{SWLOSS}$, the ripple loss current $I_{RIPPLE\_LOSS}$, the processor 110 may compute additional criteria. The processor 110 may compute the output current $I_{OUT}$ according to the following equation:

$$I_{OUT} = \frac{1}{D} \cdot (I_{IN} - I_{SWLOSSS} - I_{RIPPLE\_LOSS})$$

The processor 110 may compute the efficiency η according to one of the following equations:

$$\eta = \frac{P_{OUT}}{P_{IN}} = \frac{V_{OUT} \cdot I_{OUT}}{V_{IN} \cdot I_{IN}}$$

$$\eta = \frac{V_{OUT}}{V_{IN} \cdot D} \cdot \left(1 - \frac{I_{SWLOSS}}{I_{IN}} - \frac{I_{RIPPLE\_LOSS}}{I_{IN}}\right)$$

The processor 110 may compute the output power $P_{OUT}$ according to the following equation:

$$P_{OUT} = \eta \cdot V_{IN} \cdot I_{IN}$$

The processor 110 may compute the input power $P_{IN}$ according to the following equation (e.g., when the output current is measured instead of the input current):

$$P_{IN} = \frac{V_{OUT} \cdot I_{OUT}}{\eta}$$

The processor 110 may compute the power dissipation $P_{DISS}$ according to the following equation:

$$P_{DISS} = P_{IN} - P_{OUT}$$

As mentioned above, calculation errors due to losses (switching losses, ripple losses, etc.) create inaccurate accuracy performance, particularly at lower load. For ripple losses, the error may be significant due to large DC resistance of the inductor 208 and low output current $I_{OUT}$. The efficiency calculations with the switching and ripple losses included show that correction factors with up to 30% error can bring the calculated error to ⅓ of the non-corrected value. The characterized information of the switching loss and the ripple loss can be saved in the memory 108 for each part (or board, etc.) or just based upon a typical board in order to significantly improve calculation accuracy.

Note that from the equations for efficiency, one can determine efficiency solely by the measurement of input voltage Vin, output voltage Vout, input current Iin, and duty cycle once the correction factors are known. This implies that no output current measurement is needed, eliminating the power losses, area and/or complexity associated with external precision shunt resistors or replica device shunt FETs.

Finally, although both switching loss and ripple loss are described together above (as well as throughout the rest of the document), as previously mentioned the processor 110 may calculate and use only one, as desired in a particular implementation. For example, in when calculating the efficiency 11, the processor 110 need not include the term for $I_{RIPPLE\_LOSS}$, may consider $I_{RIPPLE\_LOSS}$ to be zero, etc.

Figure 5:
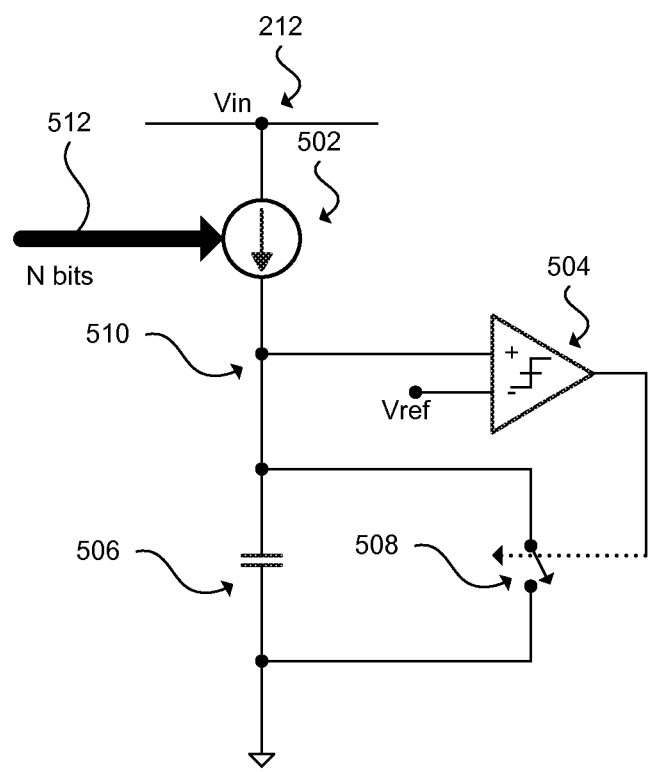
FIG. 5 is a block diagram of a circuit 500 for characterizing the switching loss.

FIG. 5 is a block diagram of a circuit 500 for characterizing the switching loss. The circuit 500 is connected to the input node 212 (see FIG. 2 or FIG. 4). The circuit 500 includes a programmable current source 502, a voltage comparator 504, a capacitor 506, and a switch 508.

The programmable current source 502 generates a test current $I_{TEST}$ at the node 510 in response to a control signal 512. The current source 502 may be a current digital to analog converter (IDAC) source. The control signal 512 may be a digital control signal with N bits. Adjusting the control signal 512 adjusts the test current.

The capacitor 506 is ratioed to the high side switch 202 and the low side switch 204 (see FIG. 2). For example, if the high side switch 202 and the low side switch 204 have a capacitance of 10×, a ratio of 10 results in the capacitor 506 having a capacitance of X. The capacitor 506 may be composed of power devices. Thus, the capacitor 506 may be composed of smaller-sized power FETs as compared to the switches 202 and 204.

The voltage comparator 504 compares a test voltage at the node 510 with a reference voltage Vref. Based on the comparison, the voltage comparator 504 outputs a switch control signal to control the switch 508. As the voltage difference changes, the switching frequency changes. In this manner, the circuit 500 implements a current-capacitance (I-C) oscillator. The I-C oscillator is tuned to the switching frequency of the buck converter 200 (see FIG. 2). The digital code of the control signal 512 to the current source 502 at this frequency represents the value of the capacitor 506.

More specifically, the control signal 512 is adjusted until a capacitance of the capacitor 506 corresponds to a switching frequency of the buck converter 200 (see FIG. 2), the reference voltage and the test current, according to the following equation:

$$T = C \cdot \frac{V_{REF}}{I_{TEST}}$$

where T is the time period (1/f, where f is the switching frequency of the buck converter 200), and $V_{REF}$ and $I_{TEST}$ are as described above. The resulting digital control signal of N bits, which represents the capacitance C, may then be stored in the memory 108 as the characterized switching loss.

The circuit 500 has a number of interesting features. First, it consumes power only during the characterization process. Second, it tracks with semiconductor process variations when the circuit 500 is fabricated as part of the voltage regulator 402 (see FIG. 4), as the capacitor 506 is composed of power devices as are the switches 202 and 204. Third, it can track with switching frequency drift if re-calibration is performed at some point during mission mode.

Figure 6:
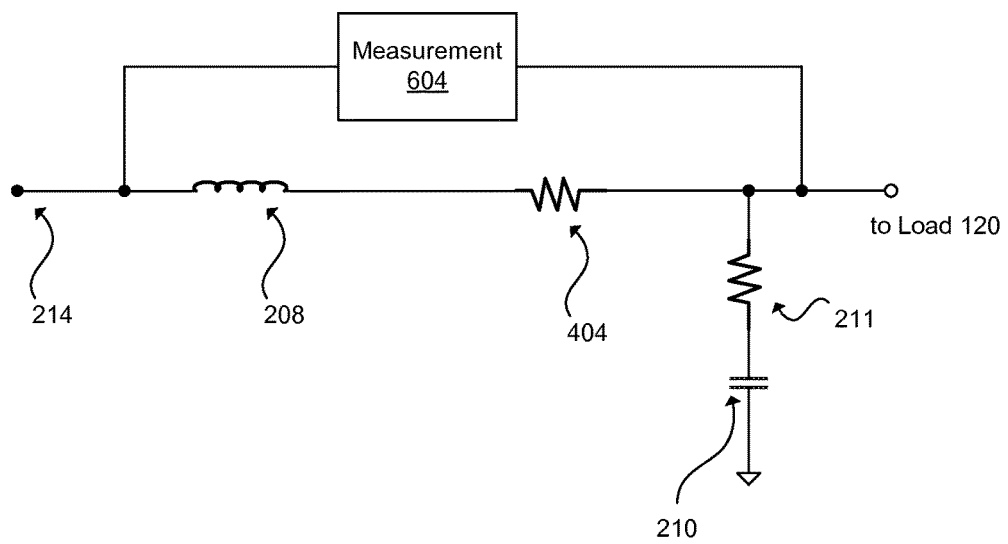
FIG. 6 is a block diagram of a circuit 600 for characterizing the ripple loss.

FIG. 6 is a block diagram of a circuit 600 for characterizing the ripple loss. The circuit 600 includes details from the electronic device 400 (see FIG. 4), such as the switching node 214, the output node 216, the inductor 208, the resistor 404, and the capacitor 210. The circuit 600 also includes a measurement circuit 604. The measurement circuit 604 measures the parasitic resistance $R_{PARASITIC}$ of the buck converter 200 (see FIG. 2) and the inductance L of the inductor 208. As discussed above in FIG. 2, the parasitic resistance $R_{PARASITIC}$ includes the combined parasitic resistance of the inductor DCR (shown as 404) plus the capacitor ESR (shown as 211), plus the high side FET RDSON*D, plus the low side FET RDSON*(1−D). These measurements of $R_{PARASITIC}$ and L are then used as the characterized ripple loss according to the ripple loss equations described above (e.g., as $R_{PARASITIC}/L^2$).

Figure 7:
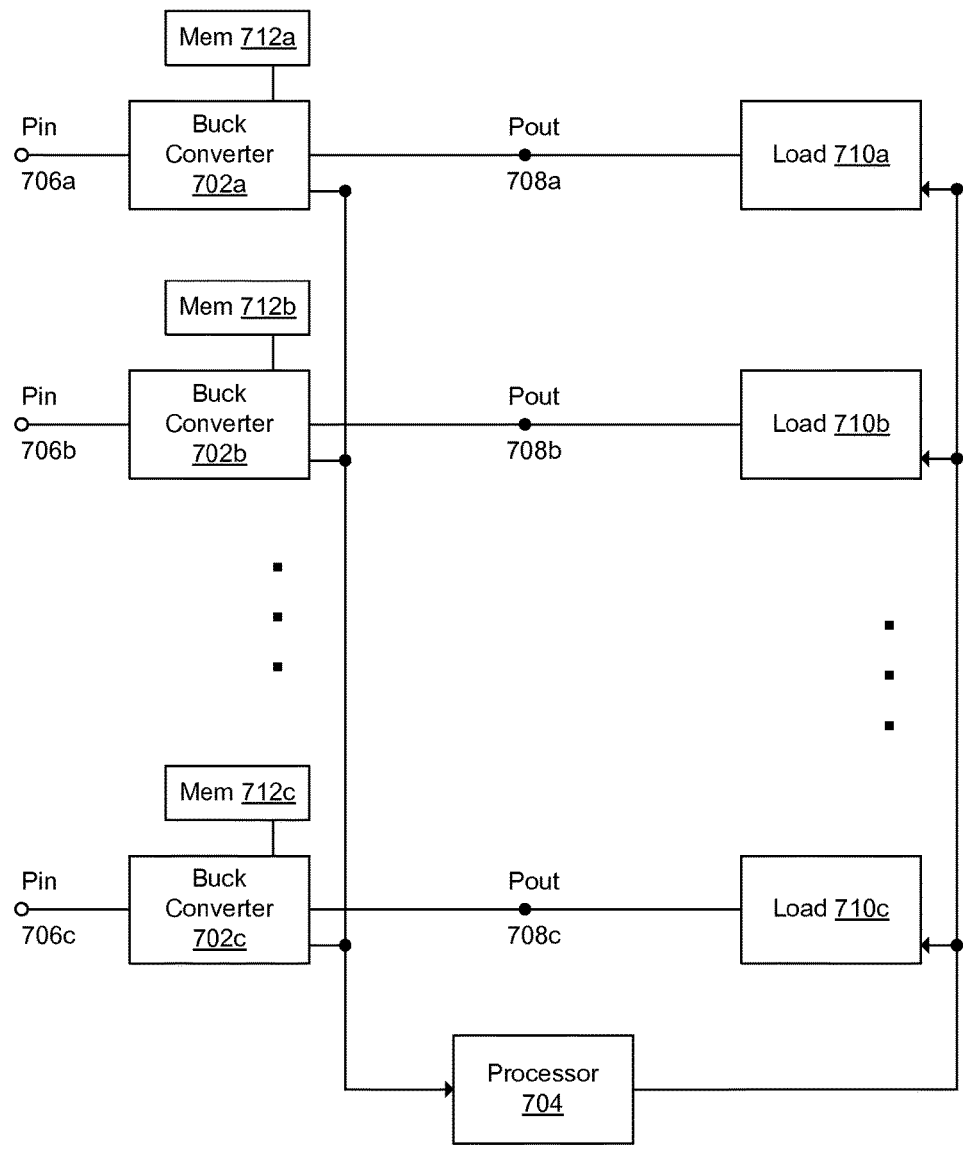
FIG. 7 is a block diagram of a system 700.

FIG. 7 is a block diagram of a system 700. The system 700 includes two or more buck converters 702 (three shown: 702a, 702b and 702c), a processor 704, and two or more memories 712 (three shown: 712a, 721b and 712c). Each of the buck converters 702 receives a respective input power Pin 706a, 706b and 706c (collectively 706) and generates a respective output power Pout 708a, 708b and 706c (collectively 708). A respective load 710a, 710b and 710c (collectively 710) receives the respective output power Pout 708. Each of the buck converters 702 is associated with a respective one of the memories 712.

The components of the system 700 may generally correspond to the components shown in other figures, as follows.

The buck converters 702 may correspond to the buck converter 104 (see FIG. 1) or the buck converter 200 (see FIG. 2). The processor 704 may correspond to the processor 110 (see FIG. 1 or FIG. 4). The memories 712 may correspond to the memory 108 (see FIG. 1 or FIG. 4). Each of the buck converters 702 and its associated memory 712 may be components of another component, such as in the voltage regulator 402 (see FIG. 4). Alternatively, a single memory may be associated with all of the buck converters 702.

As discussed above, the memories 712 store the information of the characterized loss (e.g., the characterized switching loss, the characterized ripple loss, etc.) for each associated buck converter 702. The processor 704 calculates the estimated losses (e.g., the estimated switching loss, the estimated ripple loss, etc.) and the other criteria (e.g., the efficiency, the output current, etc.) for each of the buck converters 702, as discussed above. In response to the estimated losses (or in response to the estimated losses as further calculated according to the criteria), the processor 704 adjusts the power consumption of each one or more of the loads 710. For example, the processor 704 may increase the power consumption of one or more of the loads 710, may decrease the power consumption of one or more of the loads 710, may increase the power consumption of one or more of the loads 710 and decrease it for one or more other of the loads 710, etc.

The processor 704 may adjust the power consumption of the loads 710 for load balancing purposes. For example, if one of the loads 710a is consuming a large amount of power, its associated buck converter 702a may operate inefficiency (e.g., the estimated losses are large). In response, the processor 704 may instruct the load 710a to decrease its processing frequency, which in turn reduces its power consumption. For example, when the system 700 is directed to powering the loads 710 arranged as servers in a server rack, and the processor controls the load 710a to decrease its processing frequency, new processing jobs are routed to others of the loads 710 instead of the load 710a. As another example, the system 700 may be directed to powering the loads 710 arranged as components of a system on a chip (SOC).

Figure 8:
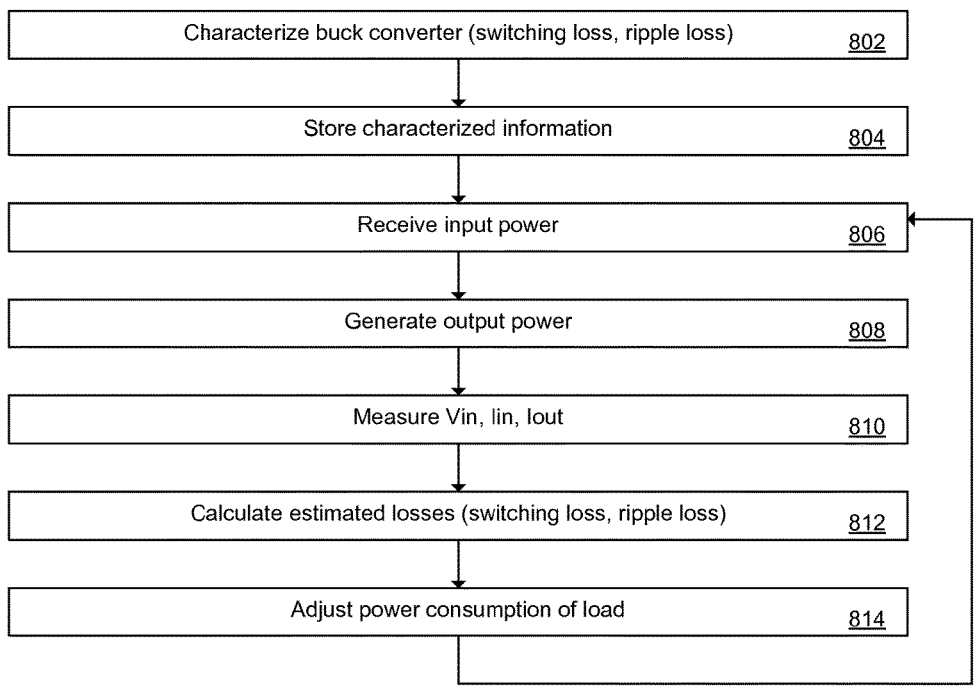
FIG. 8 is a flowchart of a method 800 of operating a buck converter.

FIG. 8 is a flowchart of a method 800 of operating a buck converter (such as the buck converter 104 of FIG. 1), or operating an electronic device that includes a buck converter (such as the electronic device 400 of FIG. 4), or operating a system with multiple buck converters (such as the system 700 of FIG. 7).

At 802, loss information of a buck converter is characterized. The characterized loss information may be information of the characterized switching loss, the characterized ripple loss, etc. For example, the circuit 500 of FIG. 5 may be used to characterize the switching loss. As another example, the circuit 600 of FIG. 6 may be used to characterize the ripple loss. The buck converter characterized may be, for example, the buck converter 104 (see FIG. 1), or a voltage regulator that includes a buck converter (e.g., the voltage regulator 402 of FIG. 4). The buck converter may be one of a number of buck converters that are characterized, for example the buck converters 702 in the system 700 (see FIG. 7).

At 804, the characterized loss information is stored. For example, the information of the characterized switching loss may be stored. The information of the characterized ripple loss may be stored. The characterized loss information may be stored in a memory, for example the memory 108 (see FIG. 1 or FIG. 4), or the memories 712 (see FIG. 7).

At 806, an input power is received by the buck converter. The input power may be received by a buck converter such as the buck converter 104 (see FIG. 1), or by a buck converter that is a component of a voltage regulator (such as the voltage regulator 402 of FIG. 4). The input power may be a plurality of input powers, for example as in the system 700 (see FIG. 7).

At 808, an output power is generated by the buck converter. The buck converter may operate according to a duty cycle, a switching frequency, or other parameters as it generates the output power. The duty cycle and switching frequency may be as described above regarding the buck converter 104 (see FIG. 1) or the buck converter 200 (see FIG. 2).

At 810, an input voltage, an input current and an output voltage are measured. For example, the voltage sensors 134 and 138, and the current sensor 136 (see FIG. 1), may perform these measurements. The current sensor 136 and the ADC 416 (see FIG. 4) may perform these measurements.

At 812, the estimated losses of the buck converter are calculated. The estimated switching loss may be calculated according to the information of the characterized switching loss, the input voltage of the buck converter, and the switching frequency of the buck converter. The estimated ripple loss may be calculated according to the information of the characterized ripple loss, the switching frequency of the buck converter, the input voltage of the buck converter, the output voltage of the buck converter, and the duty cycle of the buck converter. The processor 110 (see FIG. 1 or FIG. 4) may calculate the estimated losses. The processor 704 may calculate the estimated losses of a plurality of buck converters 702 (see FIG. 7).

The processor (e.g., the processor 110 of FIG. 1 or FIG. 4) may request the measurements (e.g., the input voltage, etc.) and parameters (e.g., the duty cycle, etc.), and may perform the calculations on the received measurements and the received parameters, according to a schedule (or otherwise as needed). The communication of this information may occur via the interfaces 418 and 430 (see FIG. 4).

At 814, the power consumption of a load that receives the output power is adjusted, in response to the estimated losses. This may include performing one or more intermediate calculations (e.g., calculating the efficiency), and performing the adjustment based on the intermediate calculations. For example, if the estimated switching loss is high, the power consumption of the load may be reduced. If the estimated ripple loss is high, the power consumption of the load may be reduced. If the efficiency is low, the power consumption of the load may be reduced. The processor 110 (see FIG. 1 or FIG. 4) may instruct (or control) the load to adjust its power consumption. The processor 704 may instruct (or control) one or more of a number of loads 710, as in the system 700 (see FIG. 7), to adjust its or their respective power consumption.

After 814, the process 800 returns to 806. In this manner, the operation of the buck converter may be continuously monitored, and the power consumption of the load may be continuously adjusted.

Note that 802-804 may be referred to as characterization mode (or setup mode), and that 806-814 may be referred to as mission mode (or operational mode). In general, characterization mode may occur before components are provided to a customer, and mission mode occurs once the components are activated by the customer or other subsequent operator. Alternatively, the process 800 may return to the characterization mode from the mission mode, for example to revise or update the characterization information, and then return again to the mission mode.

Once the losses (switching loss, ripple loss, etc.) have been estimated, other criteria may be calculated. These criteria include the output current, the efficiency, the input power, the output power, and the power dissipation. The adjustment of the power consumption in 814 may then be performed indirectly in response to the estimated losses, by performing the adjustment directly in response to the other criteria. For example, if the efficiency of the buck converter is too low, the power consumption of the load may be reduced.

The processor 110 may perform the adjustment according to one or more thresholds as applied to the calculated criteria. For example, an efficiency threshold of 95% may be stored (e.g., in the memory 108 of FIG. 1) for a particular buck regulator. The processor 110 continuously compares the calculated efficiency and the threshold. When the buck regulator is operating above the threshold, the processor 110 does not perform the adjustment. When the buck regulator is operating below the threshold, the processor performs the adjustment to reduce the power consumption of the load, which should eventually result in the efficiency increasing above the threshold.

The above description illustrates various example implementations of the present disclosure along with examples of how aspects of the particular features may be implemented. The above examples should not be deemed to be the only implementations, and are presented to illustrate the flexibility and advantages of the particular example implementations as defined by the following claims. Based on the above disclosure and the following claims, other arrangements, embodiments, implementations and equivalents may be employed without departing from the scope of the present disclosure as defined by the claims.

What is claimed is:

1. An electronic device, comprising:
    a switching power converter that receives an input power, and that generates an output power according to a duty cycle of the switching power converter, wherein the switching power converter has a switching frequency for a power switch transistor;
    a switching loss estimator circuit configured to charge a capacitance of a replica power switch transistor to provide a switching loss estimate for the power switch transistor, wherein the capacitance of the replica power switch transistor equals a ratio of a capacitance for the power switch transistor;
    an input voltage sensor that measures an input voltage of the switching power converter;
    an output voltage sensor that measures an output voltage of the switching power converter;
    a current sensor that measures an input current of the switching power converter; and
    a processor configured to calculate an output current for the switching power converter based upon the duty cycle, the input current, and the switching loss estimate,
    wherein the processor is further configured to determine the input power from the input voltage and input current and to determine the output power from the output voltage and the output current.

2. The electronic device of claim 1, wherein the processor adjusts, in response to the switching loss estimate, a power consumption of a load that receives the output power.

3. The electronic device of claim 1, wherein the switching power converter comprises a buck converter.

4. The electronic device of claim 1, wherein the switching loss estimator circuit comprises: a current source configured to generate a test current responsive to a control signal to charge the capacitance of the replica power switch transistor; and a comparator configured to control a switch to discharge the replica power switch transistor responsive to a comparison of a voltage across the replica power switch transistor and a reference voltage.

5. The electronic device of claim 1, further comprising: a ripple loss circuit configured to provide a ripple loss estimate for the switching power converter, wherein the processor is further configured to calculate the output current for the switching power converter based upon the duty cycle, the input current, the switching loss estimate, and the ripple loss estimate.

6. An electronic device, comprising:
    a buck converter that receives an input power, and that generates an output power according to a duty cycle of the buck converter, wherein the buck converter has a switching frequency;
    a memory that stores information of a characterized switching loss of the buck converter; and
    a processor that calculates an estimated switching loss of the buck converter according to the information of the characterized switching loss, an input voltage of the buck converter, and the switching frequency of the buck converter;
    a programmable current source, coupled to the input node and to a test node, that generates a test current in response to a control signal, wherein adjusting the control signal adjusts the test current;
    a voltage comparator, coupled to the test node, that outputs a switch control signal based on a comparison of a test voltage at the test node and a reference voltage;
    a capacitor, coupled to the test node, wherein the capacitor is ratioed to the high side switch and the low side switch; and
    a switch, coupled to the test node in parallel with the capacitor, that is controlled by the switch control signal,
    wherein the control signal is adjusted until a capacitance of the capacitor corresponds to a switching frequency of the buck converter, the reference voltage and the test current, wherein the characterized switching loss corresponds to the capacitance.

7. A method of operating a buck converter, comprising:
    estimating a switching loss for power switch transistors in the buck converter by charging a capacitance for replica power switch transistors, wherein the capacitance for the replica power switch transistors equals a ratio of a capacitance for the power switch transistors in the buck converter;
    receiving, by the buck converter, an input power;
    generating, by the buck converter, an output power according to a duty cycle of the buck converter, wherein the buck converter has a switching frequency;
    measuring an input voltage of the buck converter;
    measuring an output voltage of the buck converter;
    measuring an input current of the buck converter;
    in a processor, calculating an output current for the buck converter responsive to the input current, the estimated switching loss, and the duty cycle; and
    in the processor, calculating the output power from the output current and the output voltage.

8. The method of claim 7, further comprising:
calculating a ripple loss estimate for the buck converter, wherein calculating the output current for the buck converter is further responsive to the ripple loss estimate.

9. The method of claim 8, further comprising:
adjusting, in response to the ripple loss, a power consumption of a load that receives the output power.

10. The method of claim 7, further comprising:
adjusting, in response to the estimated switching loss, a power consumption of a load that receives the output power.

11. The method of claim 10, further comprising:
calculating an efficiency of the buck converter according to the input voltage of the buck converter, the output voltage of the buck converter, the duty cycle of the buck converter, the estimated switching loss, and the input current of the buck converter,
wherein adjusting the power consumption comprises adjusting, in response to the efficiency, the power consumption.

12. The method of claim 10, further comprising:
calculating a power dissipation of the buck converter according to the input voltage, the output voltage, the input current, the duty cycle, and the estimated switching loss,
wherein adjusting the power consumption comprises adjusting, in response to the power dissipation, the power consumption.

* * * * *